United States Patent [19]
Cassel et al.

[11] Patent Number: 6,089,624
[45] Date of Patent: Jul. 18, 2000

[54] PIPE LAP JOINT WITH IMPROVED COLLAPSIBLE SLOT

[75] Inventors: Scott T. Cassel, Bloomfield Hills; Michael R. Slavin, Novi; Michael R. Potts, Troy, all of Mich.

[73] Assignee: BKS Company

[21] Appl. No.: 09/310,613

[22] Filed: May 12, 1999

Related U.S. Application Data

[60] Provisional application No. 60/085,112, May 12, 1998.

[51] Int. Cl.[7] .................................................. F16L 25/00
[52] U.S. Cl. ........................... 285/382; 285/420; 285/424
[58] Field of Search .................................... 285/382, 422, 285/420, 403, 424

[56] References Cited

U.S. PATENT DOCUMENTS

| | | |
|---|---|---|
| 4,629,226 | 12/1986 | Cassel et al. ............................ 285/420 |
| 5,588,680 | 12/1996 | Cassel et al. ............................ 285/420 |
| 5,944,365 | 8/1999 | Kizler et al. ............................. 285/420 |

*Primary Examiner*—Dave W. Arola
*Attorney, Agent, or Firm*—Reising, Ethington, Barnes, Kisselle, Learman & McCulloch, P.C.

[57] ABSTRACT

A pipe lap joint is disclosed with an improved sealing zone structure in the overlap region of the pipes. The sealing zone comprises a serpentine slot extending from the end of the outer pipe to an inner end-wall of the slot. The joint comprises a band clamp with a clamping band which covers the sealing zone including the inner end of the slot. One sidewall of the slot defines an inwardly protruding tooth and the other sidewall defines another inwardly protruding tooth with a narrow passage between the teeth which is provided by rounded corners on the teeth. The slot also includes a bulbous end-wall which facilitates uniform collapse of the sealing zone. When the band clamp is tightened, the sealing zone is collapsed such that the two teeth engage each other and seal the serpentine slot against leakage.

14 Claims, 2 Drawing Sheets

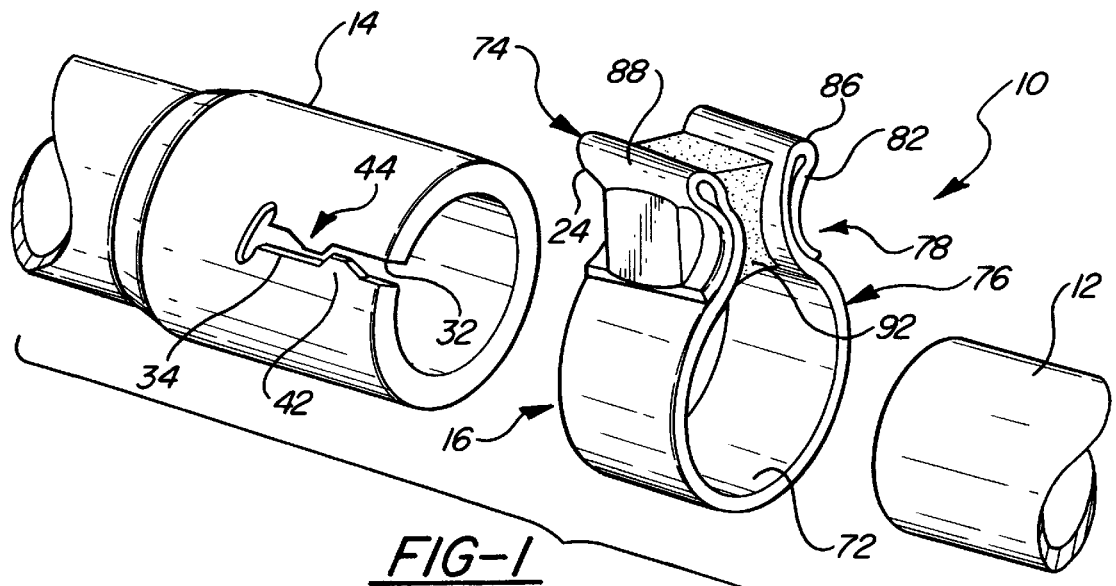
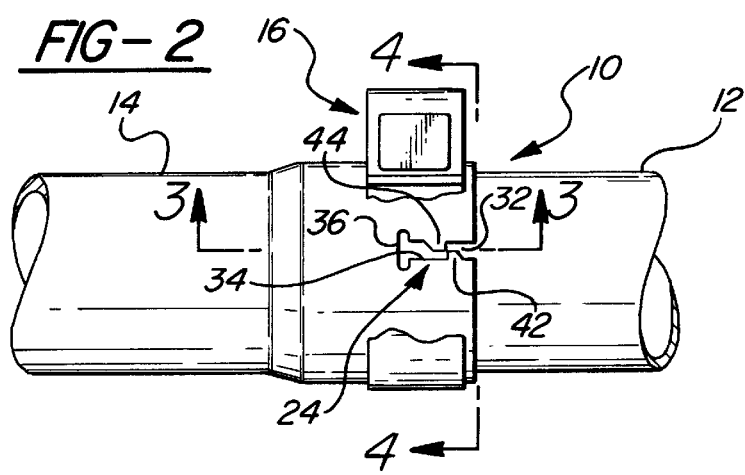
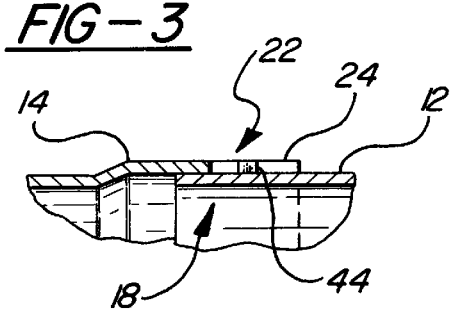
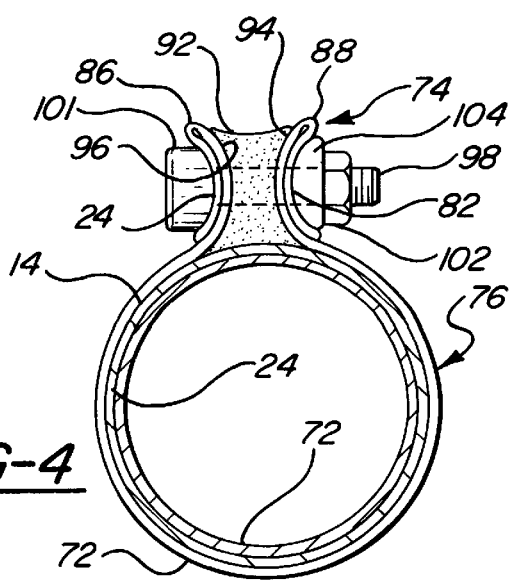

PIPE LAP JOINT WITH IMPROVED COLLAPSIBLE SLOT

This application claims benefit of Provisional Application Ser. No. 60/085,112, filed May 12, 1998.

FIELD OF THE INVENTION

This invention relates to pipe couplings; more particularly, it relates to a pipe lap joint especially adapted for use in vehicle exhaust systems.

BACKGROUND OF THE INVENTION

In vehicle exhaust systems, it is desirable to provide a pipe joint with high pull-apart strength and with a good fluid seal between the pipes. It is becoming increasingly important to achieve greater reliability and uniformity in providing exhaust pipe couplings with a good fluid seal.

In the Cassel U.S. Pat. No. 4,629,226, granted Dec. 16, 1986, a pipe lap joint is disclosed which provides a collapsible sealing zone in the outer pipe. This is achieved by providing a pair of intersecting end-to-end slots in the outer pipe which provide relief for circumferential contraction of the sealing zone within the overlap region of the pipe ends. A clamping band is disposed around the outside pipe and covers the inboard slot. When the clamping band is tightened around the outside pipe the sealing zone of the outer pipe is collapsed into close fitting engagement with the inner pipe. The intersecting outboard and inboard slots are circumferentially offset with the adjacent sidewalls in substantial alignment with each other and with the inner end wall of the outboard slot in substantial alignment with the outer end wall of the inboard slot. With this alignment and with the sidewalls and end walls of the slots being rectilinear, an inner corner of the outboard slot makes a point-to-point intersection with an outer corner of the inboard slot. With this structure, only a very small amount of collapse of the outer pipe is necessary to cause a sealing engagement between the inner end wall of the outboard slot and the outer end wall of the inboard slot.

The Cassel et al. U.S. Pat. No. 5,588,680 granted Dec. 31, 1996 discloses a pipe lap joint for vehicle exhaust system in which a pair of non-intersecting end-to-end slots are provided to afford relief for circumferential contraction of the sealing zone within the overlap region of the pipe ends. With this construction, precise location of the adjacent corners of the slots is required and the sidewalls and end walls which form the corners are rectilinear. In this pipe joint, a fluid seal is obtained upon tightening of the clamp on the outer pipe even though there is no substantial contraction of the sealing zone by collapse of the slots because a frangible bridging segment of the pipe wall extends between adjacent corners of the slots. Thus, the slots are isolated from each other when the frangible bridging element is either only slightly deformed or when it is completely fractured by collapse of the overlap region of the outer pipe.

In the prior art discussed above reliable and uniform fluid sealing is achieved in such joints. However, the production tooling requires punch and die sets which are subject to relatively short life due to the rectangular or acute angles of the corners of the slots in both the intersecting and non-intersecting slot designs. This results in undesirably high cost in punching the pipe ends to form the slots.

A general object of this invention is to overcome certain disadvantages of the prior art and to provide a pipe lap joint with an improved sealing zone.

SUMMARY OF THE INVENTION

In accordance with this invention, a pipe lap joint is provided which exhibits good fluid sealing and pull-apart strength and which can be manufactured at low cost.

Further, in accordance with this invention, a pipe lap joint is provided in which the overlap region of the outside pipe comprises a collapsible sealing zone with at least one serpentine slot extending from the end of the outer pipe to an inner end wall of the slot. The serpentine slot is open-ended at the end of the outer pipe and terminates in a closed end within the overlap region of the pipe ends. Further, in accordance with the invention, the serpentine slot terminates in a bulbous inner end.

Preferably, in accordance with the invention, the slot has first and second sidewalls extending along the length of said outside pipe to an endwall, the first sidewall defines a first tooth protruding part way across said slot and the first tooth has a first side edge, a second side edge and a top edge, the second sidewall defines a second tooth protruding part way across said slot, and the second tooth having a first side edge, a second side edge and a top edge, the first side edge of the first tooth and the first side edge of the second tooth are substantially aligned and substantially parallel with each other, and the first side edge of the first tooth and the top edge of the first tooth are joined by a rounded corner, the first side edge of the second tooth and the top edge of the second tooth are joined by a rounded corner, whereby the first side edge of the first tooth and the first side edge of the second tooth are disposed in edge-to-edge engagement with each other when the overlap region of the outside pipe is collapsed into close fitting engagement with the inside pipe by clamping the band around said outside pipe.

A complete understanding of this invention will be obtained from the detailed description that follows.

DESCRIPTION OF THE DRAWINGS

FIG. 1 is an exploded view of the lap joint of this invention showing the parts before they are assembled;

FIG. 2 shows the lap joint of this invention with the parts in assembled relation after the clamp is tightened;

FIG. 3 is a view taken on lines 3—3 of FIG. 2;

FIG. 4 is a view taken on lines 4—4 of FIG. 2;

BEST MODE FOR CARRYING OUT THE INVENTION

Figure 5:
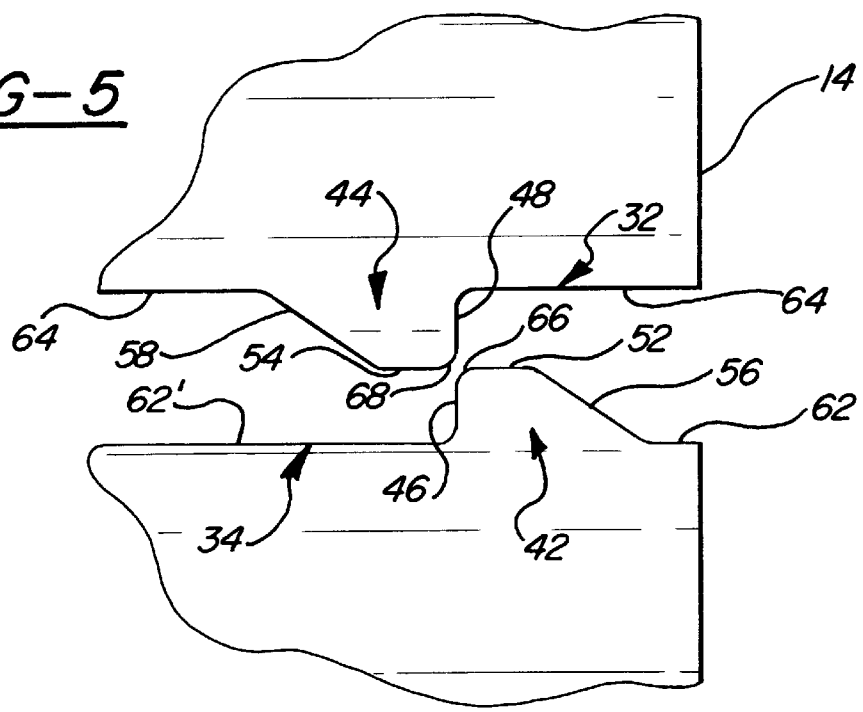
FIG. 5 is a magnified view of the serpentine slot before the outside pipe is collapsed.

Referring now to the drawings, there is shown an illustrative embodiment of the invention in a pipe lap joint which is especially adapted for use in vehicle exhaust systems. It will be appreciated as the description proceeds that the invention is useful in other embodiments and other applications.

As shown in the drawings, the pipe joint 10 of this invention comprises, in general, inside and outside pipes 12 and 14, respectively, in a telescoping relationship and with a band clamp 16 for holding the pipes together and causing engagement thereof in a fluid sealing relationship. The outside pipe 14 has a lap portion which extends over the inside pipe to provide an overlap region 18 of the pipes as shown in FIG. 3. In order to provide a fluid seal between the pipes, a radially collapsible sealing zone 22 is provided on the outside pipe 14 in the overlap region. The collapsible sealing zone will be described presently.

The sealing zone 22 comprises a ring-shaped portion of the free end of the outside pipe 14. It is adapted to be contracted or collapsed in a radial direction by the clamp 16 so that the sealing zone 22 is in close fitting engagement with the inside pipe 12. To facilitate the collapse or contraction of the sealing zone, an end portion of the outside pipe 14 is provided with a serpentine sealing slot 24. In the illustrative embodiment, only a single slot is used; however, in certain embodiments it may be desirable to use two or more slots spaced circumferentially around the pipe.

The serpentine slot 24 is shown in the perspective view of FIG. 1 before the sealing zone is collapsed and in FIG. 2 after it is collapsed. The slot is shown in more detail in FIGS. 4 and 5. The serpentine slot has an open end at the end of the outer pipe 14 and it extends generally in the axial direction of the pipe to a closed end which is disposed within the sealing zone 22 on the outside pipe 14. The serpentine slot 24 is bounded by a pair of sidewalls 32 and 34 and a bulbous end wall 36. The serpentine slot 24 defines a sinuous passage from the bulbous end wall 36 to the open end of the slot at the end of the pipe. The sinuous passage is formed by a tooth 42 in the configuration of sidewall 34 and a tooth 44 in the configuration of the sidewall 32. The tooth 42 has an inboard edge 46 which extends substantially perpendicularly to the axis of the pipe 14. The tooth 44 has an outboard edge 48 which extends substantially perpendicularly to the axis of pipe 14 and in alignment with edge 46 of tooth 42. The teeth 42 and 44 have free or end edges 52 and 54, respectively, which extend axially in substantial alignment with each other. The tooth 42 is provided with an outboard edge 56 which extends obliquely at an acute angle from the edge 52 to a juncture with an axially extending portion 62 of the sidewall 34 of the slot. The inboard edge 46 of the tooth 42 forms a juncture with an axial portion 62' of the sidewall 34. Tooth 44 is provided with an inboard edge 58 which extends obliquely at an acute angle from the end edge 54 to a juncture with an axially extending portion 64' of the sidewall 32 of the slot.

The serpentine slot 24 is shaped to provide teeth 42 and 44 in a configuration which has no angular corners formed by straight lines meeting at a point; instead, each change of direction of the sidewalls 32 and 34 is curvilinear to form the teeth. Such corners are referred to herein as "rounded" corners. Preferably, the rounded corners have a radius of about one-half millimeter or greater. The use of rounded corners on teeth 42 and 44, as opposed to angular corners, is effective to reduce the wear of the punch and die tooling so that a significant increase in the number of operating cycles is realized.

It is noted that the rounded corners 66 and 68 on the teeth 42 and 44, respectively, form a narrow passage which will provide a fluid leakage path unless it is substantially closed by tightening the clamp 16, as will be described subsequently.

The bulbous end wall 36 of the slot 24 facilitates the collapse of the sealing zone 18 under the force exerted by the clamp 16. The clearance provided by the bulbous end wall 36 allows the slot to close together uniformly along its length and thereby provides improved sealing.

Figure 6:
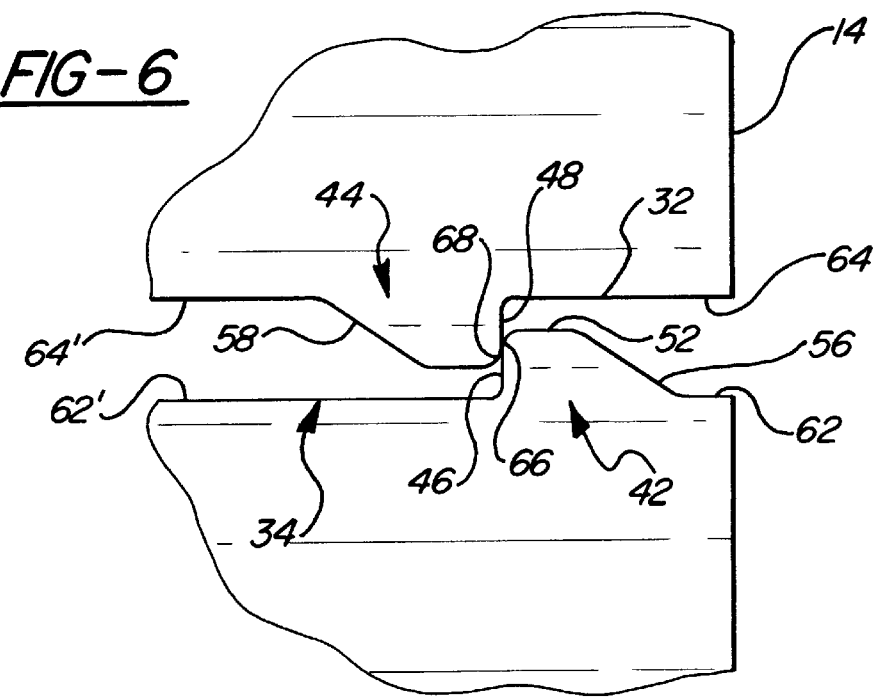
FIG. 6 is a magnified view of the serpentine slot after the outside pipe is collapsed.

FIG. 5 shows a magnified view of the teeth 42 and 44 before the outer pipe is collapsed. FIG. 6 shows a magnified view of the teeth 44 with the outer pipe collapsed radially in tight engagement with the inner pipe 12 by the tightening of clamp 16. In this condition, the teeth 42 and 44 are in engagement with each other which seals the serpentine slot against significant leakage.

Because of manufacturing tolerances on the sizes of the pipes 12 and 14, the clearance between two randomly selected pipes when the end of one is inserted into the end of the other will vary between a theoretical minimum and maximum. The amount of collapsing of the outer pipe by tightening the clamp 16 will thus vary from joint-to-joint. The dimensions of the slot 24 are such that with pipes 12 and 14 having the tightest allowable fit within manufacturing tolerances, the radial contraction of the outside pipe 14 by tightening clamp 16 will be sufficient to close the slot by engagement of the teeth 42 and 44 with each other. It has been discovered that if the pipes can be manually telescoped together there will be a sufficient collapse of the outer pipe to displace the teeth 42 and 44 into engagement so that there will be no significant leakage. This occurs because a pair of pipes having the tightest allowable fit within the specified manufacturing tolerances cannot, as a practical matter, be telescoped together due to such factors as out-of-roundness or other irregularities in the shape or surfaces of the pipes. Thus, the sealing slot 24 will provide a good fluid seal between such pipes provided that the two pipes can be telescoped together by hand. In the case of pipes 12 and 14 having the loosest allowable fit within manufacturing tolerances, sliding engagement of the teeth 42 and 44 with each other during radial contraction of pipe 14 will be allowed by the slot dimensions until the clamp 16 is fully tightened so that the outside pipe 14 is in tight engagement with the inside pipe 12. Thus the sealing slot 24 will provide a good fluid seal between two pipes having the loosest allowable fit.

The preferred clamp for use with the invention will be described with reference to FIGS. 1, 2 and 3. The clamp 16 comprises a clamping band 72 which is disposed around the outer pipe 14 over the sealing zone 22. The clamping band 72, for sealing purposes, must cover the inboard end of the slot 24 and cover the juncture of the teeth 42 and 44. The clamping band 72 is provided with a tightening means 74. The clamping band 72 is, for the most part, circular or roundish in cross-section. It has a roundish sector 76 adapted to fit around the sealing zone 22 on the pipe 14 and a channel-shaped sector 78 which comprises a pair of sidewalls 82 and 84 extending radially outwardly from the roundish sector. The clamping band 72 is made of a single piece of sheet metal and each free end thereof is folded back on itself to form a double layer. Thus, the sidewalls 82 and 84 are of double thickness and terminate at their outer ends in respective loops or bights 86 and 88. The bights 86 and 88 serve as retaining members for holding the sidewalls in place when the tightening means 74 is tightened, as will be described subsequently.

The clamping band 72 is tightened around the pipe 14 by the tightening means 74. The tightening means comprises a reaction member or spline 92 which is disposed within the channel-shaped sector 78 and which is adapted to seat upon the outer surface of the sealing zone 22 of pipe 14. For this purpose, the spline has an inner surface of arcuate configuration conforming to the pipe 14. The spline 92 is provided with a pair of oppositely facing concave surfaces 94 and 96. The tightening means includes a bolt 98 and a nut 102. It also includes a spacer 104 disposed outside the sidewall 82 and having a convex surface which is opposite the concave surface 94 of the spline 92. The bolt 98 has a head 101 with a convex surface which is disposed outside the sidewall 84 opposite the concave surface 96 on the spline 92. The bolt extends through holes in the sidewalls 94 and 96, the spline 92 and the spacer 104.

When the pipe joint 10 is assembled and the nut 102 is tightened on the bolt 98, the relationship of the parts is as shown in FIGS. 2 and 4. It will be understood that, before the nut and bolt are tightened, the sidewalls 82 and 84 of the channel-shaped sector 78 are not seated against the spline 92. When the nut 102 is tightened, the bolt head 101 and the spacer 104 are drawn together and press the sidewalls 82 and 84 into seating engagement with the spline 92. As a result of this tightening action, the roundish sector 76 is stretched around the sealing zone 22 of the pipe 14 in tight engagement therewith. This tightening action of the clamp 16 exerts sufficient force on the sealing zone 22 to collapse the sealing zone and thereby move the teeth 42 and 44 into engagement to seal the slot 24.

Although the description of this invention has been given with reference to a particular embodiment it is not to be construed in a limiting sense. Many variations and modifications will now occur to those skilled in the art.

What is claimed is:

1. In a coupling for a pipe lap joint of the type comprising:

an inside pipe and an outside pipe in telescoping relationship to provide an overlap region on the end of each pipe, said overlap region on the outside pipe defining a slot, said slot extending through the end of said outside pipe, a clamping band disposed around said outside pipe and covering said slot, tightening means for clamping said band around said outside pipe to clamp the pipes together and collapse the overlap region of said outside pipe into close fitting engagement with said inside pipe to cause sealing engagement of said outside pipe with said inside pipe and with said band, the improvement wherein:

said slot has first and second sidewalls extending along the length of said outside pipe to an end-wall, said first sidewall defines a first tooth protruding part way across said slot, said first tooth having a first side edge, a second side edge and a top edge, said second sidewall defines a second tooth protruding part way across said slot, said second tooth having a first side edge, a second side edge and a top edge, said first side edge of said first tooth and said first side edge of said second tooth being substantially aligned and substantially parallel with each other, said first side edge of said first tooth and said top edge of said first tooth being joined by a rounded corner, said first side edge of said second tooth and said top edge of said second tooth being joined by a rounded corner, whereby said first side edge of said first tooth and said first side edge of said second tooth are disposed in edge-to-edge engagement with each other when the overlap region of said outside pipe is collapsed into close fitting engagement with said inside pipe by clamping said band around said outside pipe.

2. The invention as defined in claim 1 wherein said rounded corners are spaced apart from each other before said outer pipe is collapsed.

3. The invention as defined in claim 1 wherein the top edge of said first tooth is substantially perpendicular to said first side edge of said first tooth and the top edge of said second tooth is substantially perpendicular to the first side edge of said second tooth.

4. The invention as defined in claim 2 wherein the second side edge of said first tooth extends transversely of said slot at an acute angle with said top edge of said first tooth, and said second side edge of said second tooth extends transversely of said slot at an acute angle to said top edge of said second tooth.

5. The invention as defined in claim 4 wherein said first sidewall extends inwardly from said second side edge of said first tooth and is joined therewith by a rounded corner, said second sidewall extends outwardly from said first side edge of said second tooth and is joined therewith by a rounded corner.

6. The invention as defined in claim 2 wherein said slot has a bulbous end-wall.

7. The invention as defined in claim 6 wherein the first and second sidewalls of said slot are joined at the inner end of said slot by a bulbous end-wall.

8. The invention as defined in claim 7 wherein said bulbous end-wall extends transversely of said sidewalls and has oppositely disposed first and second rounded inside corners.

9. The invention as defined in claim 8 wherein said first rounded inside corner is joined with said second rounded inside corner by a straight edge.

10. The invention as defined in claim 5 wherein said rounded corners have a radius of about one-half millimeters.

11. The invention as defined in claim 9 wherein said rounded corners have a radius of about one-half millimeters.

12. The invention as defined in claim 1 wherein:

said band is an open loop with its free ends extending radially outwardly, and said tightening means includes at least one bolt and nut extending through said free ends for drawing the ends together.

13. The invention as defined in claim 12 wherein:

said band has a cross-section including a roundish sector and a radially projecting channel-shaped sector, said channel-shaped sector comprises a pair of sidewalls extending outwardly from the roundish sector and being separated from each other at the outer ends to form an opening in the band, a spline disposed between the sidewalls and having a pair of surfaces which are respectively opposite said pair of sidewalls, one of said surfaces of said spline being concave, a bar disposed against one sidewall opposite said concave surface of the spline, said tightening means including at least one bolt and nut with the bolt extending laterally through the said bar, sidewalls and spline and being adapted to force the sidewalls against the respective surfaces of the spline, whereby the band is stretched around said overlap region.

14. The invention as defined in claim 13 wherein:

said band comprises a single piece of sheet metal and each said sidewall is folded back on itself to provide a double layer of sheet metal.

* * * * *